J. Ball.
Making Cigars.
N° 2,809.   Patented Oct. 12, 1842.
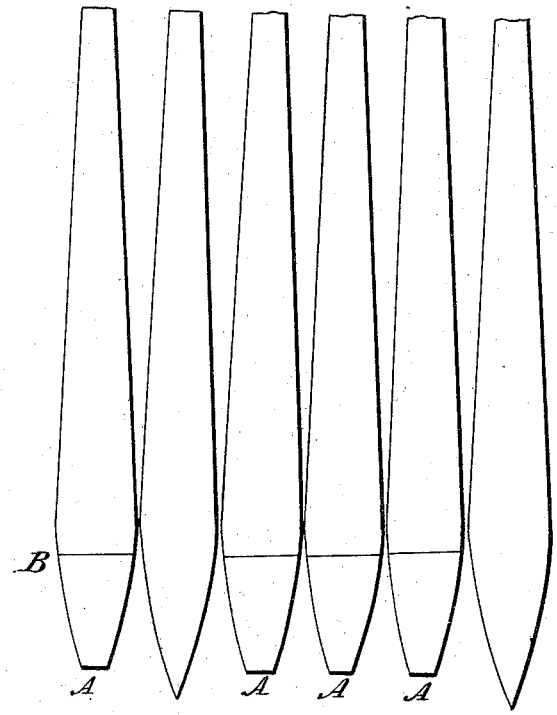
Witnesses
Michael Salenger
Isaac Labagh
Inventor
Jonathan Ball

UNITED STATES PATENT OFFICE.

JONATHAN BALL, OF BUFFALO, NEW YORK.

IMPROVEMENT IN MAKING CIGARS.

Specification forming part of Letters Patent No. 2,809, dated October 12, 1842.

*To all whom it may concern:*

Be it known that I, JONATHAN BALL, of the city of Buffalo, in the county of Erie and State of New York, have invented a new and useful method of preparing cigars; and I do hereby declare the following to be a clear, full, and exact description of the same in its operation and composition.

The nature of my invention consists in rendering the end of the cigar impervious to the moisture of the mouth, thus entirely preventing the ill effects of the tobacco to the lips, and at the same time preventing the ill effects of the moisture of the mouth to the cigar, without which it becomes saturated and loathsome, preserving at the same time the draft or passage for the smoke perfectly free and open. The method I employ is to form a composition of gum-shellac dissolved in alcohol or any other substance that will dry quick and is impervious to water. I cut with shears or other sharp instrument the point from the cigar. (See letter A in the accompanying drawings.) I dip the end so cut into the solution, (see letter B,) which soon becomes hard and dry and impervious to the moisture of the mouth, pleasant for use, and tasteless.

What I claim as my invention, and wish to secure by Letters Patent, is—

The application of the solution to the cigar, which renders it impervious to water, using therefor gum-shellac or any other insoluble substances which will produce the intended effect.

JONATHAN BALL.

Witnesses:
    I. LABAGH,
    MICHAEL SALENGER.